(12) United States Patent
Tanaka et al.

(10) Patent No.: US 11,050,089 B2
(45) Date of Patent: Jun. 29, 2021

(54) NON-AQUEOUS ELECTROLYTE SOLUTION, NON-AQUEOUS ELECTROLYTE SECONDARY BATTERY USING NON-AQUEOUS ELECTROLYTE SOLUTION, BATTERY PACK USING NON-AQUEOUS ELECTROLYTE SECONDARY BATTERY, AND ELECTRONIC APPARATUS

(71) Applicant: MURATA MANUFACTURING CO., LTD., Kyoto (JP)

(72) Inventors: Masatomo Tanaka, Kanagawa (JP);
Yasuhiro Nakamura, Kanagawa (JP);
Akira Ichihashi, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 186 days.

(21) Appl. No.: 15/749,833

(22) PCT Filed: Jul. 20, 2016

(86) PCT No.: PCT/JP2016/003391
§ 371 (c)(1),
(2) Date: Feb. 2, 2018

(87) PCT Pub. No.: WO2017/026094
PCT Pub. Date: Feb. 16, 2017

(65) Prior Publication Data
US 2018/0226686 A1 Aug. 9, 2018

(30) Foreign Application Priority Data
Aug. 11, 2015 (JP) .............................. JP2015-158933

(51) Int. Cl.
*H01M 10/0569* (2010.01)
*H01M 10/0568* (2010.01)
(Continued)

(52) U.S. Cl.
CPC ..... *H01M 10/0569* (2013.01); *H01M 10/052* (2013.01); *H01M 10/0525* (2013.01);
(Continued)

(58) Field of Classification Search
CPC ......... H01M 10/0569; H01M 10/0525; H01M 10/0567; H01M 10/0568; H01M 10/42;
(Continued)

(56) References Cited

U.S. PATENT DOCUMENTS

2009/0023074 A1* 1/2009 Matsui ................... H01G 11/58
429/326
2010/0028785 A1* 2/2010 Choi ................. H01M 10/0525
429/337

FOREIGN PATENT DOCUMENTS

CN 102136604 7/2011
JP 2008-123714 5/2008
(Continued)

OTHER PUBLICATIONS

JP2014022328MT (Year: 2014).*
(Continued)

*Primary Examiner* — Alexander Usyatinsky
(74) *Attorney, Agent, or Firm* — Sheridan Ross P.C.

(57) ABSTRACT

To provide a non-aqueous electrolyte solution capable of improving cycle characteristics of a secondary battery, and a non-aqueous electrolyte secondary battery using the non-aqueous electrolyte solution.
A non-aqueous electrolyte solution according to an embodiment of the present technology includes an electrolyte salt and a non-aqueous solvent. The electrolyte salt contains an imide salt as a main electrolyte salt and at least one lithium oxalate borate selected from the group consisting of lithium bis(oxalate) borate (LiBOB), lithium fluoro(oxalate) borate (LiFOB), and lithium difluoro(oxalate) borate (LiDFOB).
(Continued)

The non-aqueous solvent contains at least one halogenated carbonic acid ester selected from the group consisting of a halogenated chain carbonic acid ester and a halogenated cyclic carbonic acid ester.

18 Claims, 3 Drawing Sheets

(51) Int. Cl.
*H01M 10/052* (2010.01)
*H02J 7/00* (2006.01)
*H01M 10/0525* (2010.01)
*H01M 10/0567* (2010.01)
*H01M 10/42* (2006.01)

(52) U.S. Cl.
CPC ... *H01M 10/0567* (2013.01); *H01M 10/0568* (2013.01); *H01M 10/425* (2013.01); *H02J 7/0068* (2013.01); *H02J 7/0077* (2013.01); *H01M 2010/4271* (2013.01); *H01M 2300/0034* (2013.01)

(58) Field of Classification Search
CPC ............ H01M 10/052; H01M 10/425; H01M 2010/4271; H01M 2300/0034; H02J 7/00; H02J 7/0077; H02J 7/0068
See application file for complete search history.

(56) References Cited

FOREIGN PATENT DOCUMENTS

| | | | |
|---|---|---|---|
| JP | 2008123714 | * | 5/2008 |
| JP | 2010-034050 | | 2/2010 |
| JP | 2014-022328 | | 2/2014 |
| JP | 2014022328 | * | 2/2014 |
| KR | 10-1002566 | | 12/2010 |

OTHER PUBLICATIONS

JP2008123714 MT (Year: 2008).*
International Search Report prepared by the Japan Patent Office dated Sep. 6, 2016, for International Application No. PCT/JP2016/003391.
Official Action (no English translation available) for Chinese Patent Application No. 201680045404.X, dated Nov. 18, 2019, 12 pages.
Official Action (no English translation available) for Korean Patent Application No. 10-2017-7036407, dated Dec. 11, 2019, 9 pages.

* cited by examiner

NON-AQUEOUS ELECTROLYTE SOLUTION, NON-AQUEOUS ELECTROLYTE SECONDARY BATTERY USING NON-AQUEOUS ELECTROLYTE SOLUTION, BATTERY PACK USING NON-AQUEOUS ELECTROLYTE SECONDARY BATTERY, AND ELECTRONIC APPARATUS

CROSS REFERENCE TO RELATED APPLICATIONS

This application is a national stage application under 35 U.S.C. 371 and claims the benefit of PCT Application No. PCT/JP2016/003391 having an international filing date of 20 Jul. 2016, which designated the United States, which PCT application claimed the benefit of Japan Patent Application No. 2015-158933 filed 11 Aug. 2015, the disclosures of each of which are incorporated herein by reference.

TECHNICAL FIELD

The present technology relates to a non-aqueous electrolyte solution, a non-aqueous electrolyte secondary battery using the non-aqueous electrolyte solution, a battery pack using the non-aqueous electrolyte secondary battery, and an electronic apparatus.

BACKGROUND ART

In recent years, a secondary battery, particularly, a lithium ion secondary battery, has been used in a wide range of applications in a mobile apparatus such as a smartphone, a stationary apparatus such as a power storage system, and the like, and it is demanded to increase the capacity and performance thereof.

In order to increase the capacity and performance of the lithium ion secondary battery, various studies have been made on negative electrode materials, materials of electrolyte solutions, and combinations thereof. For example, Patent Literature 1 describes a lithium secondary battery including a negative electrode containing a negative electrode active material that contains a silicon-containing alloy, an electrolyte containing a lithium salt, and an ethylene carbonate-based compound. Further, Patent Literature 2 describes a lithium ion secondary battery including a negative electrode using, as a material, a compound of Si containing C, an unsaturated cyclic carbonic acid ester, and an electrolyte salt containing a lithium salt.

CITATION LIST

Patent Literature

Patent Literature 1: Japanese Patent Application Laid-open No. 2007-19027
Patent Literature 2: Japanese Patent Application Laid-open No. 2013-131395

DISCLOSURE OF INVENTION

Technical Problem

However, in the lithium secondary battery described in Patent Literature 1, since the reactivity between $LiPF_6$ used as an electrolyte salt and silicon is high, they are easily reacted to form a thick SEI coating film on the surface. The formed SEI coating film irreversibly absorbs Li. As a result, the capacity of the lithium ion secondary battery is reduced. Therefore, in the lithium secondary battery described in Patent Literature 1, sufficient cycle characteristics cannot be obtained.

Similarly, in Patent Literature 2, it is described that $LiPF_6$ is favorable as a lithium salt, and sufficient cycle characteristics cannot be obtained depending on the combination of materials constituting the lithium secondary battery.

In view of the circumstances as described above, it is an object of the present technology to provide a non-aqueous electrolyte solution capable of improving cycle characteristics of a secondary batter and a non-aqueous electrolyte secondary battery using the non-aqueous electrolyte solution.

Solution to Problem

A non-aqueous electrolyte solution according to an embodiment of the present technology includes an electrolyte salt; and a non-aqueous solvent.

The electrolyte salt contains an imide salt as a main electrolyte salt, the imide salt being represented by a following formula (1), and at least one lithium oxalate borate selected from the group consisting of lithium bis(oxalate) borate (LiBOB), lithium fluoro(oxalate) borate (LiFOB), and lithium difluoro(oxalate) borate (LiDFOB).

The non-aqueous solvent contains at least one halogenated carbonic acid ester selected from the group consisting of a halogenated chain carbonic acid ester represented by a following formula (2) and a halogenated cyclic carbonic acid ester represented by a following formula (3).

[Chem. 1]

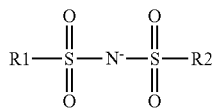

(1)

(in the formula, R1 and R2 each independently represent a hydrogen atom, a halogen atom, an alkyl group, or a halogenated alkyl group, and at least one of them is a halogen atom or a halogenated alkyl group.)

[Chem. 2]

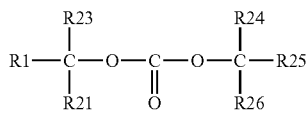

(2)

(in the formula, R21 to R26 each independently represent a hydrogen atom, a halogen atom, an alkyl group, or a halogenated alkyl group, and at least one of them is a halogen atom or a halogenated alkyl group.)

[Chem. 3]

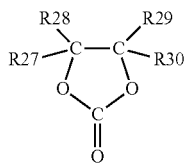
(3)

(in the formula, R27 to R30 each independently represent a hydrogen atom, a halogen atom, an alkyl group, or a halogenated alkyl group, and at least one of them is a halogen atom or a halogenated alkyl group.)

According to the above-mentioned configuration, since the electrolyte salt contains the above-mentioned imide salt and the above-mentioned lithium oxalate borate, it is possible to obtain excellent cycle characteristics. Further, since the non-aqueous solvent contains the above-mentioned halogenated carbonic acid ester, it is possible to obtain excellent battery characteristics.

Further, the content of the imide salt may be not less than 0.3 mol/kg and not more than 2.5 mol/kg with respect to the total amount of the non-aqueous solvent. Accordingly, it is possible to obtain excellent battery characteristics.

Further, the content of the lithium oxalate borate may be not less than 0.1 wt % and not more than 10 wt % with respect to the total amount of the imide salt and the non-aqueous solvent. Accordingly, it is possible to obtain more excellent cycle characteristics.

Further, the non-aqueous solvent may contain the halogenated chain carbonic acid ester. In this case, the halogenated chain carbonic acid ester may be at least one kind selected from the group consisting of fluoromethyl methyl carbonate, bis(fluoromethyl) carbonate, and difluoromethyl methyl carbonate. Accordingly, it is possible to obtain more excellent battery characteristics.

The non-aqueous solvent may contain the halogenated cyclic carbonic acid ester. In this case, the halogenated cyclic carbonic acid ester may be at least one kind selected from the group consisting of 4-fluoro-1,3-dioxolan-2-one, (FEC), and 4,5-Difluoro-1,3-dioxolan-2-one (DFEC). Accordingly, it is possible to obtain more excellent battery characteristics.

The halogenated carbonic acid ester may have a volume of not less than 75% of a volume of the non-aqueous solvent. Accordingly, it is possible to obtain more excellent battery characteristics.

The imide salt may be lithium bis(trifluoromethanesulfonyl) imide (LiTFSI). Accordingly, it is possible to obtain more excellent cycle characteristics.

The lithium oxalate borate may be lithium bis(oxalate) borate (LiBOB). Accordingly, it is possible to obtain more excellent cycle characteristics.

A non-aqueous electrolyte secondary battery according to an embodiment of the present technology includes a positive electrode; a negative electrode; and a non-aqueous electrolyte solution containing an electrolyte salt and a non-aqueous solvent. The electrolyte salt may contain an imide salt as a main electrolyte salt, the imide salt being represented by a following formula (1), and at least one lithium oxalate borate selected from the group consisting of lithium bis(oxalate) borate (LiBOB), lithium fluoro(oxalate) borate (LiFOB), and lithium difluoro(oxalate) borate (LiDFOB).

The non-aqueous solvent may contain at least one halogenated carbonic acid ester selected from the group consisting of a halogenated chain carbonic acid ester represented by a following formula (2) and a halogenated cyclic carbonic acid ester represented by a following formula (3).

[Chem. 1]

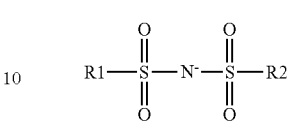
(1)

(in the formula, R1 and R2 each independently represent a hydrogen atom, a halogen atom, an alkyl group, or a halogenated alkyl group, and at least one of them is a halogen atom or a halogenated alkyl group.)

[Chem. 2]

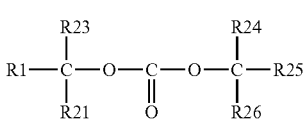
(2)

(in the formula, R21 to R26 each independently represent a hydrogen atom, a halogen atom, an alkyl group, or a halogenated alkyl group, and at least one of them is a halogen atom or a halogenated alkyl group.)

[Chem. 3]

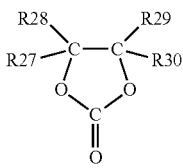
(3)

(in the formula, R27 to R30 each independently represent a hydrogen atom, a halogen atom, an alkyl group, or a halogenated alkyl group, and at least one of them is a halogen atom or a halogenated alkyl group.)

According to the above-mentioned configuration, since the electrolyte salt contains the above-mentioned imide salt and the above-mentioned lithium oxalate borate, it is possible to obtain excellent cycle characteristics. Further, the non-aqueous solvent contains the above-mentioned halogenated carbonic acid ester, it is possible to obtain excellent battery characteristics.

Further, the negative electrode may include a negative electrode current collector and a negative electrode active material layer provided in the negative electrode current collector. In this case, the negative electrode active material layer may contain at least one metal material selected from the group consisting of a simple substance, an alloy, and a compound of silicon and a simple substance, an alloy, and a compound of tin, and at least one carbon material. Accordingly, it is possible to obtain more excellent battery characteristics.

Further, the non-aqueous solvent may contain the halogenated cyclic carbonic acid ester. In this case, the halogenated cyclic carbonic acid ester may be 4-fluoro-1,3-dioxolan-2-one, (FEC). Accordingly, it is possible to obtain more excellent battery characteristics.

Further, the imide salt may be lithium bis(trifluoromethanesulfonyl) imide (LiTFSI). Accordingly, it is possible to obtain more excellent cycle characteristics.

Further, the lithium oxalate borate may be lithium bis(oxalate) borate (LiBOB). Accordingly, it is possible to obtain more excellent cycle characteristics.

A battery pack according to an embodiment of the present technology includes a non-aqueous electrolyte secondary battery; a control unit that controls charging and discharging of the non-aqueous electrolyte secondary battery; and a package body that supports the non-aqueous electrolyte secondary battery and the control unit.

The non-aqueous electrolyte secondary battery includes a positive electrode, a negative electrode, and a non-aqueous electrolyte solution containing an electrolyte salt and a non-aqueous solvent.

The electrolyte salt contains an imide salt as a main electrolyte salt, the imide salt being represented by a following formula (1), and at least one lithium oxalate borate selected from the group consisting of lithium bis(oxalate) borate (LiBOB), lithium fluoro(oxalate) borate (LiFOB), and lithium difluoro(oxalate) borate (LiDFOB), The non-aqueous solvent contains at least one halogenated carbonic acid ester selected from the group consisting of a halogenated chain carbonic acid ester represented by a following formula (2) and a halogenated cyclic carbonic acid ester represented by a following formula (3).

[Chem. 1]

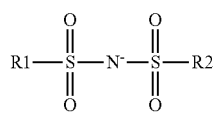

(1)

(in the formula, R1 and R2 each independently represent a hydrogen atom, a halogen atom, an alkyl group, or a halogenated alkyl group, and at least one of them is a halogen atom or a halogenated alkyl group.)

[Chem. 2]

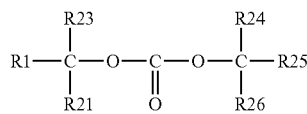

(2)

(in the formula, R21 to R26 each independently represent a hydrogen atom, a halogen atom, an alkyl group, or a halogenated alkyl group, and at least one of them is a halogen atom or a halogenated alkyl group.)

[Chem. 3]

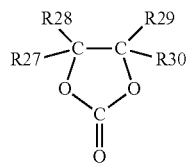

(3)

(in the formula, R27 to R30 each independently represent a hydrogen atom, a halogen atom, an alkyl group, or a halogenated alkyl group, and at least one of them is a halogen atom or a halogenated alkyl group.)

According to the above-mentioned configuration, the electrolyte salt contains the above-mentioned imide salt and the above-mentioned lithium oxalate borate, it is possible to obtain excellent cycle characteristics. Further, since the non-aqueous solvent contains the above-mentioned halogenated carbonic acid ester, it is possible to obtain excellent battery characteristics.

An electronic apparatus according to an embodiment of the present technology includes a non-aqueous electrolyte secondary battery and a power receiving circuit that receives power supply from the non-aqueous electrolyte secondary battery.

The non-aqueous electrolyte secondary battery includes a positive electrode, a negative electrode, and a non-aqueous electrolyte solution containing an electrolyte salt and a non-aqueous solvent.

The electrolyte salt contains an imide salt as a main electrolyte salt, the imide salt being represented by a following formula (1), and at least one lithium oxalate borate selected from the group consisting of lithium bis(oxalate) borate (LiBOB), lithium fluoro(oxalate) borate (LiFOB), and lithium difluoro(oxalate) borate (LiDFOB).

The non-aqueous solvent contains at least one halogenated carbonic acid ester selected from the group consisting of a halogenated chain carbonic acid ester represented by a following formula (2) and a halogenated cyclic carbonic acid ester represented by a following formula (3).

[Chem. 1]

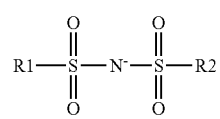

(1)

(in the formula, R1 and R2 each independently represent a hydrogen atom, a halogen atom, an alkyl group, or a halogenated alkyl group, and at least one of them is a halogen atom or a halogenated alkyl group.)

[Chem. 2]

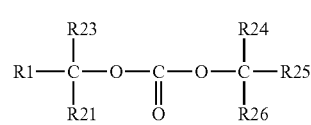

(2)

(in the formula, R21 to R26 each independently represent a hydrogen atom, a halogen atom, an alkyl group, or a halogenated alkyl group, and at least one of them is a halogen atom or a halogenated alkyl group.)

[Chem. 3]

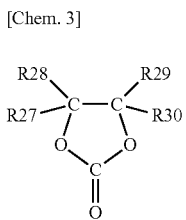

(3)

(in the formula, R27 to R30 each independently represent a hydrogen atom, a halogen atom, an alkyl group, or a halogenated alkyl group, and at least one of them is a halogen atom or a halogenated alkyl group.)

According to the above-mentioned configuration, since the electrolyte salt contains the above-mentioned imide salt and the above-mentioned lithium oxalate borate, it is possible to obtain excellent cycle characteristics. Further, since the non-aqueous solvent contains the above-mentioned halogenated carbonic acid ester, it is possible to obtain excellent battery characteristics.

Advantageous Effects of Invention

As described above, according to the present technology, it is possible to obtain excellent battery characteristics.

It should be noted that the effect described here is not necessarily limitative and may be any effect described in the present disclosure.

MODE(S) FOR CARRYING OUT THE INVENTION

Hereinafter, embodiments of the present technology will be described with reference to the drawings.

First Embodiment

[Configuration of Secondary Battery]

Figure 1:
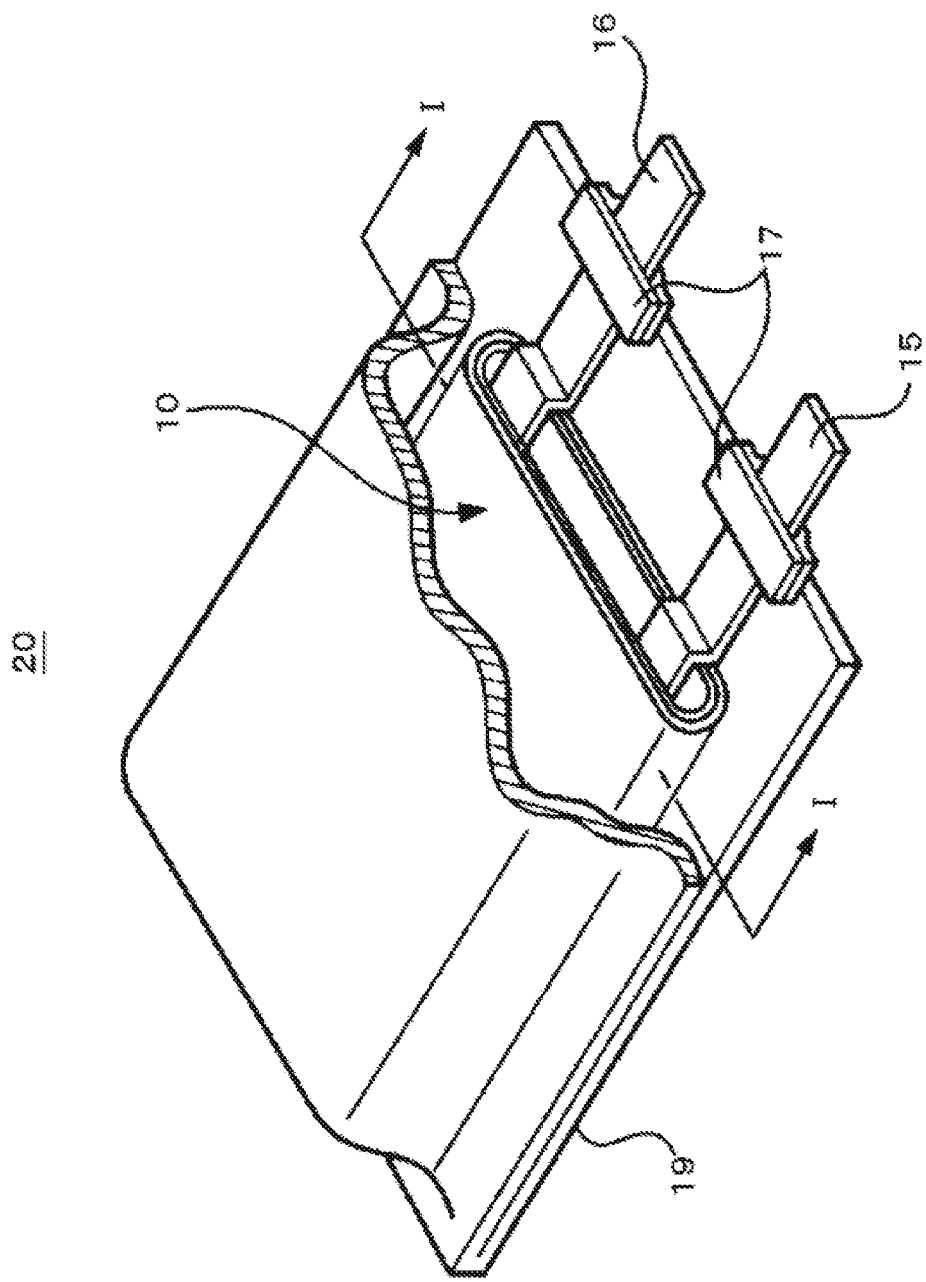
FIG. 1 is a partially broken perspective view showing a secondary battery using an electrolyte solution according to an embodiment of the present technology.
Figure 2:
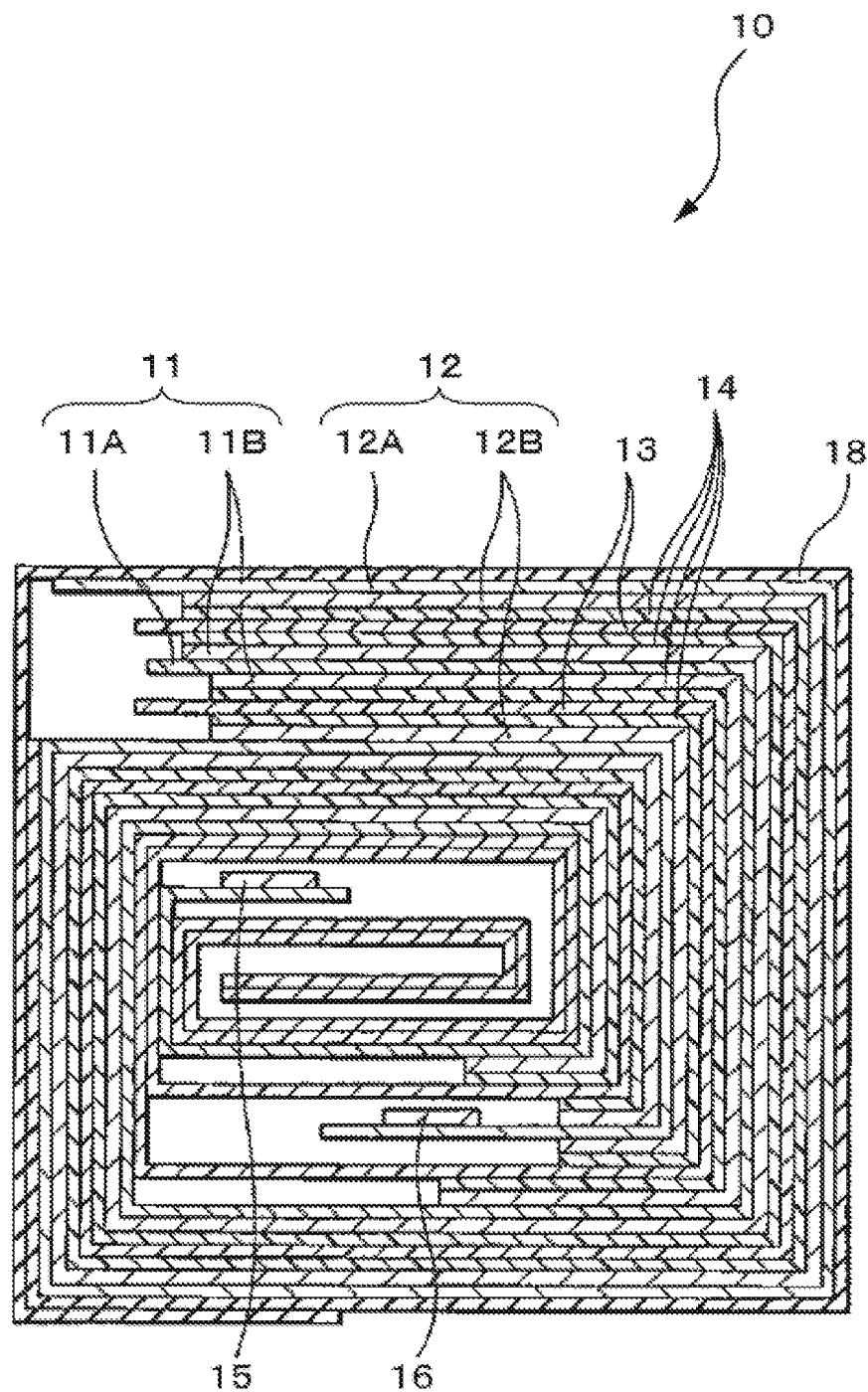
FIG. 2 is a schematic cross-sectional view taken along line I-I of FIG. 1.

FIG. 1 is a partially broken perspective view showing a configuration example of a secondary battery according to an embodiment of the present technology. FIG. 2 is a cross-sectional view taken along line I-I of FIG. 1 schematically showing an electrode lamination structure of the above-mentioned secondary battery.

Hereinafter, an example in which the present technology is applied to a lithium ion secondary battery will be described. A secondary battery 20 according to this embodiment includes an electrode body 10 to which a positive electrode lead 15 and a negative electrode lead 16 are attached, and a film-like exterior member 19 housing the electrode body 10, and is formed in a flat shape as a whole. The positive electrode lead 15 and the negative electrode lead 16 each have, for example, a strip shape, and are each led from the inside of the exterior member 19 to the outside in the same direction, for example. The positive electrode lead 15 is formed of, for example, a metal material such as aluminum (Al) and stainless steel (SUS), and the negative electrode lead 16 is formed of, for example, a metal material such as copper (Cu), nickel (Ni), and SUS.

[Electrode Body]

As shown in FIG. 2, the electrode body 10 is obtained by laminating a positive electrode 11 and a negative electrode 12 via a separator 13 and an electrolyte layer 14 and winding them. A protective tape 18 is attached to the outermost peripheral part of the electrode body 10 to maintain the wound state.

[Positive Electrode]

The positive electrode 11 includes a positive electrode current collector 11A and a positive electrode active material layer 11B containing a positive electrode active material. The positive electrode active material layer 11B is formed on both surfaces of the positive electrode current collector 11A. As the positive electrode current collector 11A, for example, metal foil such as aluminum foil nickel foil, and stainless steel foil can be used.

The positive electrode active material layer 11B contains, as a positive electrode active material, any one or two or more kinds of positive electrode materials capable of absorbing and releasing lithium ions, and may contain another material such as a positive electrode binder and a positive electrode conductive agent as necessary.

It is favorable that the positive electrode material is a lithium-containing compound. This is because a high energy density can be obtained. Examples of this lithium-containing compound include a lithium transition metal composite oxide, a lithium transition metal phosphate compound, and the like. The lithium transition metal composite oxide is an oxide containing Li and one or more transition metal elements as constituent elements, and the lithium transition metal phosphate compound is a phosphate compound containing Li and one or more transition metal elements as constituent elements. Among them, the transition metal element is favorably any one or two or more kinds of Co, Ni, Mn, Fe, and the like. This is because higher voltage can be obtained. The chemical formula is represented by, for example, $Li_xM1O_2$ and $Li_yM2PO_4$. In the formula, M1 and M2 each represent one or more transition metal elements. The values of x and y vary depending on the charge and discharge state, but satisfy the relationships, $0.05 \leq x \leq 1.1$ and $0.05 \leq y \leq 1.1$, for example.

Examples of the lithium transition metal composite oxide include $LiCoO_2$, $LiNiO_2$, a lithium nickel-based composite oxide represented by the following formula (4), and the like. Examples of the lithium transition metal phosphate compound includes $LiFePO_4$, $LiFe_{1-u}Mn_uPO_4$ (u<1), and the like. This is because a high battery capacity can be obtained and excellent cycle characteristics and the like can also be obtained.

$$LiN_{1-z}M_zO_2 \quad (4)$$

(M represents any one or two or more kinds of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z satisfies the relationship, 0.005<z<0.5)

In addition, the positive electrode material may be, for example, any one or two or more kinds of an oxide, a disulfide, a chalcogenide, a conductive polymer, and the like. Examples of the oxide include a titanium oxide, a vanadium oxide, manganese dioxide, and the like. Examples the disulfide include a titanium disulfide, a molybdenum sulfide, and the like. Examples of the chalcogenide include a niobium selenide and the like. Examples of the conductive polymer include sulfur, polyaniline, polythiophene, and the like. However, the positive electrode material may be a material other than those described above.

Examples of the positive electrode conductive agent include carbon materials such as graphite, carbon black, acetylene black, and Ketjen black. These may be used alone or a plurality of kinds of them may be mixed and used. Note that the positive electrode conductive agent may be a metal material, a conductive polymer, or the like as long as it has conductivity.

Examples of the positive electrode binder include synthetic rubber such as styrene butadiene rubber, fluorine rubber, and ethylene propylene diene, and polymer materials such as polyvinylidene fluoride and polyimide. These may be used alone or a plurality of kinds of them may be mixed and used.

The positive electrode 11 includes the positive electrode lead 15 connected to one end of the positive electrode current collector 11A by spot welding or ultrasonic welding. Although this positive electrode lead 15 is desirably metal foil having a mesh shape, there is no problem even in the case where it is not metal as long as it is electrochemically and chemically stable and can be conducted.

[Negative Electrode]

The negative electrode 12 includes a negative electrode current collector 12A and a negative electrode active material layer 12B containing a negative electrode active material. The negative electrode active material layer 12B is formed on both surfaces of the negative electrode current collector 12A. As the negative electrode current collector 12A, metal foil such as copper (Cu) foil, nickel foil, and stainless steel foil can be used.

The negative electrode active material layer 12B contains, as negative electrode active materials, a first negative electrode material and a second negative electrode material that are capable of absorbing and releasing lithium ions, and may contain another material such as a negative electrode binder and a negative electrode conductive agent as necessary. Details the negative electrode binder and the negative electrode conductive agent are the same as those of the positive electrode binder and the positive electrode conductive agent, for example.

In order to prevent lithium metal from unintentionally precipitating on the negative electrode during charging, it is favorable that the chargeable capacity of the first and second negative electrode materials is larger than the discharge capacity of the positive electrode. That is, it is favorable that the electrochemical equivalent of the negative electrode material capable of absorbing and releasing lithium ions is larger than the electrochemical equivalent of the positive electrode.

The first negative electrode material is a material (metallic material) containing, as constituent elements, any one or two or more kinds of metal elements or metalloid elements that react with Li. This is because a high energy density can be obtained. This metallic material may be a simple substance, an alloy, a compound, two or more kinds thereof, or a material having at least partially one or more phases thereof.

This "alloy" encompasses not only a material formed of two or more kinds of metal element but also a material containing one or more kinds of metal elements and one or more kinds of metalloid elements. Further, the "alloy" may also contain non-metal elements. Tissues thereof include a solid solution, a eutectic crystal (eutectic mixture), or an intermetallic compound, and two or more thereof may coexist.

Examples of the above-mentioned metal elements or metalloid elements include lithium metal. Further, examples of metal elements or metalloid elements that are capable of forming alloys with lithium include magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Among them, one or both of Si and Sn are favorable. This is because since Si and Sn are excellent in ability to absorb and release lithium ions, a high energy density can be obtained and it is possible to increase the battery capacity.

The material (high capacity material) containing one or both of Si and Sn as constituent elements may be a simple substance, an alloy, or a compound of Si or Sn, two or more kinds thereof, or a material having at least partially one or more phases thereof. However, the term "simple substance" used herein is a simple substance (which may contain a small amount of impurities) in a general sense, and does not necessarily mean purity of 100%.

Examples of the alloy of silicon include those containing, as a second constituent element other than silicon, at least one kind selected from the group consisting of tin, nickel, copper, iron, cobalt, manganese, zinc, indium, silver, titanium, germanium, bismuth, antimony (Sb), and chromium (Cr). Examples of the compound of silicon include those containing, as a constituent element other than silicon, oxygen (O) or carbon (C). The compound of silicon may contain the above-mentioned second constituent elements in addition to silicon.

Examples of the alloy or compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $CuSi$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $Li_xSiO_y$ ($0<x\leq4$, $0<y\leq4$). Note that v in SiOv desirably satisfies the relationship, $0.2<v<1.4$, and more desirably, $0.8<v<1.2$.

Further, these alloys and compounds may absorb lithium in advance.

Examples of the alloy of tin include those containing, as a second constituent element other than tin, at least one kind selected from the group consisting of silicon, nickel, copper, iron, cobalt, manganese, zinc, indium, silver, titanium, germanium, bismuth, antimony, and chromium. Examples of the compound of tin include those containing oxygen or carbon. The compound of tin may contain the above-mentioned second constituent elements in addition to tin. Examples of the alloy or compound of tin include $SnO_w$ ($0<w\leq2$), $SnSiO_3$, $LiSnO$, and $Mg_2Sn$.

In particular, as the material containing Sn as a constituent element, for example, a material containing Sn as a first constituent element and second and third constituent elements. The second constituent element is, for example, one or more kinds of Co, Fe, Mg, Ti, V, Cr, Mn, Ni, Cu, Zn, Ga, Zr, Nb, Mo, Ag, In, Ce, Hf, Ta, W, Bi, Si, and the like. The third constituent element is, for example, one or more kinds of B, C, Al, P, and the like. This is because a high energy density can be obtained by containing the second and third constituent elements.

Among them, a material containing Sn, Co, and C as constituent elements (SnCoC-containing material) is favorable. In this SnCoC-containing material, for example, the content of C is 9.9% by mass to 29.7% by mass, and the ratio of the content of Sn and the content of Co (Co/(Sn+Co)) is 20% by mass to 70% by mass. This is because a high energy density can be obtained.

The SnCoC-containing material has a phase containing Sn, Co, and C, and the phase is favorably low crystalline or amorphous. Since this phase is a reactive phase capable of reacting with Li, excellent properties can be obtained thanks to the presence of the reactive phase. The full width at half maximum of the diffraction peak obtained by x-ray diffraction of this phase is favorably not less than 1° at the diffraction angle 2θ in the case where CuKα ray is used as specific X-rays, and the sweeping speed is set to 1°/min. This is because lithium ions are more smoothly absorbed and released, and the reactivity with the electrolyte solution is reduced. Note that the SnCoC-containing material contains a single substance of each constituent element or has a phase partially containing each constituent element, in addition to the low crystalline or amorphous phase, in some cases.

Whether or not the diffraction peak obtained by x-ray diffraction corresponds to the reactive phase capable of reacting with Li can be easily determined by comparing the x-ray diffraction charts before and after the electrochemical reaction with Li. For example, in the case where the position of the diffraction peak changes before and after the electrochemical reaction with Li, it corresponds to the reactive phase capable of reacting with Li. In this case, for example, a diffraction peak of the low crystalline or amorphous reactive phase is found between 2θ=20° to 50°. Such a reactive phase is considered to contain each constituent element described above, and to be low crystallized or amorphous mainly due to the presence of C, for example.

It is favorable that in the SnCoC-containing material, at least a part of the constituent element C is bonded to a metal element or a metalloid element as another constituent element. This is because aggregation and crystallization of Sn and the like are suppressed. The bonding state of the element can be checked by using, for example, X-ray photoelectron spectroscopy (XPS). In commercially available apparatuses, for example, Al-Kα ray and Mg-Kα ray are used as soft X-rays. In the case where at least a part of C is bonded to a metal element, a metalloid element, or the like, the peak of the composite wave of the is orbit of C (C1s) appears in a lower region than 284.5 eV. Note that energy calibration is performed so that the peak of the 4f orbit of an Au atom (Au4f) is obtained at 84.0 eV. At this time, since there is normally surface-contaminated carbon present in the surface of the material, the peak of C1s of the surface-contaminated carbon is set to 284.8 eV, and this peak is used as an energy reference. In the XPS measurement, since a waveform of the peak of Cis can be obtained as a form that includes both the peak of the surface-contaminated carbon and the peak of carbon from the SnCoC-containing material, for example, through an analysis using commercial software programs, the peaks can be separated from each other. In the analysis of the waveform, the position of a main peak existing closer to the lowest binding energy is used as an energy reference (284.8 eV).

Note that the SnCoC-containing material is not limited to a material including only constituent elements of Sn, Co, and C (SnCoC). This SnCoC-containing material may contain, as a constituent element, any one or two or more kinds of Si, Fe, Ni, Cr, In, Nb, Ge, Ti, Mo, Al, P, Ga, and Bi, for example, in addition to Sn, Co, and C.

In addition to the SnCoC-containing material, also a material containing Sn, Co, Fe, and C as constituent elements (SnCoFeC-containing material) is favorable. The composition of this SnCoFeC-containing material is arbitrary. For example, in the case where the content of Fe is set to a small value, the content of C is 9.9% by mass to 29.7% by mass, the content of Fe is 0.3% by mass to 5.9% by mass, and the ratio of the content of Sn and the content of Co(Co/(Sn+Co)) is 30% by mass to 70% by mass. Further, in the case where the content of Fe is set to a large value, the content of C is 11.9% by mass to 29.7% by mass, the ratio of the content of Sn, the content of Co, and the content of Fe ((Co+Fe)/(Sn+Co+Fe)) is 26.4% by mass to 48.5% by mass, and the ratio of the content of Co and the content of Fe (Co/(Co+Fe)) is 9.9% by mass to 79.5% by mass. This is because a high energy density can be obtained in such a composition range. Note that the physical properties of the SnCoFeC-containing material (full width at half maximum, etc.) are similar to those of the above-mentioned SnCoC-containing material.

The second negative electrode material is a carbon material containing graphite. Since the carbon material has a low potential when absorbing lithium ions, a high energy density can be obtained and it is possible to increase the battery capacity. Further, the carbon material functions also as a conductive agent. This carbon material is, for example, natural graphite, artificial graphite, a material obtained by coating them with amorphous carbon, or the like. Note that the shape of the carbon material is fibrous, spherical, granular, scaly, or the like.

In addition thereto, the negative electrode material may be, for example, one or more kinds of easily graphitizable carbon, hardly graphitizable carbon, a metal oxide, a polymer compound, and the like. Examples of the metal oxide include an iron oxide, a ruthenium oxide, a molybdenum oxide, and the like. Examples of the polymer compound include polyacetylene, polyaniline, polypyrrole, and the like. However, the negative electrode material may be another material other than those described above.

[Separator]

The separator 13 isolates the positive electrode 11 and the negative electrode 12 in the battery, and causes ions to pass while preventing a short circuit of current due to contact between both electrodes. The separator 13 is, for example, a porous film formed of synthetic resin, ceramic, or the like, and may be a laminated film in which two or more kinds of porous films are laminated. Examples of the synthetic resin include polytetrafluoroethylene, polypropylene, polyethylene, and the like.

In the secondary battery 20 according to this embodiment, when charging is performed, for example, lithium ions are released from the positive electrode 11 and absorbed in the negative electrode 12 via the secondary battery impregnated in the separator 13. Meanwhile, when discharging is performed, for example, lithium ions are released from the negative electrode 12 and absorbed in the positive electrode 11 via the non-aqueous electrolyte solution impregnated in the separator 13.

[Non-Aqueous Electrolyte Solution]

The electrolyte layer 14 contains a non-aqueous electrolyte solution. The non-aqueous electrolyte solution contains an electrolyte salt and a non-aqueous solvent. Further, as necessary, it may contain another material such as an additive.

(Non-Aqueous Solvent)

The non-aqueous solvent contains at least one halogenated carbonic acid ester selected from the group consisting of a halogenated chain carbonic acid ester represented by the following formula (2) and a halogenated cyclic carbonic acid ester represented by the following formula (3).

[Chem. 2]

[Chem. 3]

Substituent groups represented by R21 to R30 are not particularly limited. For example, R21 to R30 may each be any one of a hydrogen group, a halogen group, an alkyl group, and a halogenated alkyl group. The halogen group may be any one of a fluorine group (—F), a chlorine group (—Cl), a bromine group (—Br), and an iodine group (—I). The alkyl group may be a methyl group, an ethyl group, a propyl group, an isopropyl group, a butyl group, an s-butyl group, an isobutyl group, a t-butyl group, or the like. The halogenated alkyl group may be a group in which at least a part of hydrogen groups of the alkyl group is substituted with a halogen group.

Since the non-aqueous solvent contains the above-mentioned halogenated carbonic acid ester, a stable protective film is formed mainly on the surface of the negative electrode 22 during charging and discharging. Accordingly, the decomposition reaction of the electrolyte solution is suppressed. Therefore, it is possible to improve the capacity maintenance ratio when charging and discharging are repeated. The halogenated carbonic acid ester is a cyclic or chain carbonic acid ester containing one or more halogens as constituent elements. Examples of the cyclic halogenated carbonic acid ester includes 4-fluoro-1,3-dioxolan-2-one, 4,5-difluoro-1,3-dioxolan-2-one, and the like. Examples of the chain halogenated carbonic acid ester includes fluoromethyl methyl carbonate, bis(fluoromethyl) carbonate, difluoromethylmethyl carbonate, and the like.

The non-aqueous solvent contains any one or more kinds of different non-aqueous solvents such as organic solvents. Examples of the different non-aqueous solvents include a cyclic carbonic acid ester, a chain carbonic acid ester, a lactone, a chain carboxylic acid ester, a nitrile, and the like. This is because excellent battery capacity, cycle characteristics, storage characteristics, and the like can be obtained. Examples of the cyclic carbonic acid ester include ethylene carbonate, propylene carbonate, butylene carbonate, and the like. Examples of the chain carbonic acid ester include dimethyl carbonate, diethyl carbonate, ethyl methyl carbonate, methyl propyl carbonate, and the like. Examples of the lactone include γ-butyrolactone, γ-valerolactone, and the like. Examples of the carboxylic acid ester include methyl acetate, ethyl acetate, methyl propionate, ethyl propionate, methyl butyrate, methyl isobutyrate, methyl trimethylacetate, ethyl trimethyl acetate, and the like. Examples of the nitrile include acetonitrile, glutaronitrile, adiponitrile, methoxyacetonitrile, 3-methoxypropionitrile, and the like.

In addition thereto, as the different non-aqueous solvents, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methyl pyrrolidinone, N-methyloxazolidinone, N,N'-dimethylimidazolidinone, nitromethane, nitroethane, sulfolane, trimethyl phosphate, dimethylsulfoxide, and the like may be used. This is because similar advantages can be obtained.

Among them, any one or two or more kinds of ethylene carbonate, propylene carbonate, dimethyl carbonate, diethyl carbonate, and ethyl methyl carbonate are favorable. This is because more excellent battery capacity, cycle characteristics, storage characteristics, and the like can be obtained. In this case, the combination of a high viscosity (high dielectric constant) solvent (e.g., relative permittivity ε≥30) such as ethylene carbonate and propylene carbonate, and a low viscosity solvent (e.g., viscosity ≤1 mPa·s) such as dimethyl carbonate, ethyl methyl carbonate, and diethyl carbonate is more favorable. This is because the dissociation property of the electrolyte salt and the mobility of ions are improved.

In particular, the non-aqueous solvent favorably contains one or more kinds of unsaturated cyclic carbonic acid esters. This is because a stable protective film is formed mainly on the surface of the negative electrode 22 during charging and discharging, so that the decomposition reaction of the electrolyte solution is suppressed. The unsaturated cyclic carbonic acid ester is a cyclic ester carbonate containing one or more unsaturated carbon bonds (carbon-carbon double bond). Examples of the unsaturated cyclic carbonic acid ester include vinylene carbonate, vinyl ethylene carbonate, methylene ethylene carbonate, and the like. The content of the unsaturated cyclic carbonic acid ester in the non-aqueous solvent is not particularly limited, but is, for example, 0.01% by weight to 10% by weight.

Further, the non-aqueous solvent favorably contains any one or two or more kinds of sultone (cyclic sulfonic acid ester). This is because the chemical stability of the electrolyte solution is further improved. Examples of this sultone include propane sultone, propene sultone, and the like. Although the content of sultone in the non-aqueous solvent is not particularly limited, it is, for example, 0.5% by weight to 5% by weight.

Further, the non-aqueous solvent favorably contains any one or two or more kinds of acid anhydrides. This is because the chemical stability of the electrolyte solution is improved. Examples of this acid anhydride include carboxylic acid anhydride, disulfonic acid anhydride, carboxylic acid sulfonic acid anhydride, and the like. Examples of the carboxylic acid anhydride include succinic anhydride, glutaric anhydride, maleic anhydride, and the like. Examples of the disulfonic acid anhydride include ethanedisulfonic acid anhydride, propane disulfonic acid anhydride, and the like. Examples of the carboxylic acid sulfonic acid anhydride include sulfobenzoic acid anhydride, sulfopropionic acid anhydride, sulfobutyric acid anhydride, and the like. The content of the acid anhydride in the non-aqueous solvent is not particularly limited, but is, for example, 0.5% by weight to 5% by weight.

The halogenated carbonic acid ester favorably has the volume of not less than 75% of the volume of the above-mentioned non-aqueous solvent. With this, a stable protective film is formed on the surfaces of the positive electrode 11 and the negative electrode 22, and the reactivity is suppressed.

(Electrolyte Salt)

The electrolyte salt contains an imide salt represented by the following formula (1) as a main electrolyte salt, and at least one lithium oxalate borate. In addition thereto, as necessary, one or more kinds of different lithium salts, another salt other than the lithium salt (e.g., light metal salt other than the lithium salt) may be contained. Note that the phrase "imide salt as a main electrolyte salt" means that the weight percent of the imide salt with respect to the total weight percent of the electrolyte salts is the highest among the electrolyte salts. The weight percent of the imide salt with respect to the total weight percent of the electrolyte salts is favorably 50 wt % to 90 wt %.

[Chem. 1]

Substitution groups represented by R1 and R2 are not particularly limited. For example, R1 and R2 may be any one of a hydrogen group, a halogen group, an alkyl group, and a halogenated alkyl group. The halogen group may be any one of a fluorine group (—F), a chlorine group (—Cl), a bromine group (—Br), and an iodine group (—I). The alkyl group may be a methyl group, an ethyl group, a propyl group, an isopropyl group, a butyl group, an s-butyl group, an isobutyl group, a t-butyl group, or the like. The halogenated alkyl group may be a group in which at least a part of hydrogen groups of the alkyl group is substituted with a halogen group.

(Imide Salt)

Examples of the imide salt include lithium imide salts such as lithium bis(fluorosulfonyl) imide (LiFSI), lithium bis(trifluoromethanesulfonyl) imide (LiTFSI), and lithium bis(perfluoroethanesulfonyl) imide, a potassium imide salt, a sodium imide salt, and the like. With this, high ion conductivity and chemical stability are obtained. Note that these imide salts may be each used alone as a main electrolyte salt, or a combination of two or more kinds thereof may be used as a main electrolyte salt. Further, the content of the imide salt is favorably not less than 0.3 mol/kg and not more than 2.5 mol/kg with respect to the total weight of the non-aqueous solvent. Within this range, it is possible to obtain high ion conductivity and chemical stability. In the case where the content of the imide salt is less than 0.3 mol/kg of the total weight of the non-aqueous solvent, sufficiently high ion conductivity and chemical stability cannot be obtained. Further, in the case where it exceeds 2.5 mol/kg, the viscosity increases, which may adversely affects the input/output characteristics.

(Lithium Oxalate Borate)

Examples of the lithium oxalate borate include lithium bis(oxalate) borate (LiBOB), lithium fluoro(oxalate) borate (LiFOB), lithium difluoro(oxalate) borate (LiDFOB), and the like. With this, since a protective layer is formed on the surface of the positive electrode, the chemical stability is improved. Further, the content of the lithium oxalate borate is favorably not less than 0.1 wt % and not more than 10 wt % with respect to the total weight of the imide salt and the non-aqueous solvent. More favorably, it is not less than 0.2 wt % and not more than 7 wt %. Further more favorably, it is not less than 0.3 wt % and not more than 5 wt %. In the case where the content of the lithium oxalate borate is less than 0.1 wt %, the above-mentioned effects cannot be sufficiently obtained. Similarly, also in the case where the content of the lithium oxalate borate exceeds 10 wt %, the above-mentioned effects cannot be sufficiently obtained.

Examples of the different lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). This is because excellent battery capacity, cycle characteristics, and storage characteristics, and the like can be obtained.

Among them, any one or two or more kinds of $LiPF_6$, $LiBF_4$, $LiClO_4$, and $LiAsF_6$ are more favorable. This is because since the internal resistance is reduced, higher effects can be obtained.

Note that in the case where $LiPF_6$ is used as the different lithium salt, the content thereof is favorably less than 10 wt % of the total weight of the non-aqueous electrolyte solution. This is because in the case of using $LiPF_6$, a thick coating film is formed on the surface of the negative electrode 22, which reduces the cycle characteristics.

[Exterior Member]

The exterior member 19 is, for example, a laminated film having a structure in which a heat fusion layer, a metal layer, and an exterior resin layer are laminated in the stated order and bonded by lamination processing or the like. Outer edge portions of the exterior member 19 are brought into close contact with each other by fusion bonding or an adhesive with the side of the heat fusion layer being the inside, for example.

The heat fusion layer is formed of, for example, polyolefin resin such as polyethylene, polypropylene, modified polyethylene, modified polypropylene, and a copolymer thereof. This type of resin material has low moisture permeability and is excellent in airtightness. The metal layer is formed of foil or plate-like aluminum, stainless steel, nickel, iron (Fe), or the like. The exterior resin layer may be formed of, for example, resin similar to that of the heat fusion layer, or may be formed of polyamide or the like. With this, it is possible to increase the strength against breakage or puncture. The exterior member 19 may include another layer other than the heat fusion layer, the metal layer, and the exterior resin layer.

Among them, the exterior member is favorably an aluminum laminated film in which a polyethylene film, aluminum foil, and a nylon film is laminated in the stated order. However, the exterior member may be a laminated film having another laminated structure, a polymer film such as polypropylene, or a metal film.

Between the exterior member 19 and the positive electrode lead 15 and between the exterior member 19 and the negative electrode lead 16, adhesion films 17 for improving the adhesiveness between the positive electrode lead 15 and the inside of the exterior member 19 and between the negative electrode lead 16 and the inside of the exterior member 19 and preventing intrusion of outside air are inserted. The adhesion films 17 are formed of a material having adhesiveness to the positive electrode lead 15 and the negative electrode lead 16. In the case where the positive electrode lead 15 and the negative electrode lead 16 are formed of the above-mentioned metal material, the adhesion films 17 are each formed of, for example, polyolefin resin such as polyethylene, polypropylene, modified polyethylene, and modified polypropylene.

Note that the adhesion film 17 may be omitted as necessary. That is, in the case where predetermined adhesiveness between a sealing resin layer 191 of exterior sheets 19A and 19B and each of the positive electrode lead 15 and the negative electrode lead 16 can be obtained, it does not necessarily need to place the adhesion film 17.

According to this embodiment, it is possible to produce the secondary battery 20 with an improved capacity retention rate after repeating charging and discharging.

[Method of Producing Secondary Battery]

The secondary battery 20 is produced by, for example, the following three kinds of procedures.

In a first procedure, a positive electrode is produced first. In this case, a positive electrode active material and, if necessary, a positive electrode binder, a positive electrode conductive agent, and the like are mixed to obtain a positive electrode mixture. Next, the positive electrode mixture is dispersed in an organic solvent or the like to obtain a paste-like positive electrode mixture slurry. Next, the positive electrode mixture slurry is applied to both surfaces of a positive electrode current collector and then dried to form a positive electrode active material layer. Next, the positive electrode active material layer is compression molded using a roll press machine or the like while heating as necessary. In this case, the compression molding may be repeated a plurality of times.

Further, a negative electrode is produced by a similar procedure to that for the above-mentioned positive electrode. In this case, a negative electrode mixture obtained by mixing a negative electrode active material, a negative electrode binder (binding polymer compound), and if necessary, a negative electrode conductive agent, and the like, is dispersed in an organic solvent or the like to obtain a paste-like negative electrode mixture slurry. Next, the negative electrode mixture slurry is applied to both surfaces of a negative electrode current collector and then dried to form a negative electrode active material layer. After that, as necessary, the negative electrode active material layer is compression molded.

Next, an adhesive layer is formed on the negative electrode. In this case, after preparing a processing solution by dispersing an adhesive polymer compound in an organic solvent or the like, the processing solution is applied to the surface of the negative electrode active material layer and then dried.

Next, after preparing a precursor solution containing an electrolyte solution in which an electrolyte salt is dispersed in a solvent, a polymer compound for electrolyte, and a solvent such as an organic solvent, the precursor solution is applied to the positive electrode to form a gel-like electrolyte layer. Next, a positive electrode lead is attached to the positive electrode current collector by using a welding method or the like, and a negative electrode lead is attached to the negative electrode current collector by using a welding method. Next, after the positive electrode and the negative electrode are laminated via the separator and then wound to produce a wound electrode body, a protective tape is attached to the outermost peripheral part thereof. Next, after sandwiching the wound electrode body between two film-like exterior members, outer peripheral edge portions of the exterior members are attached to each other by a thermal fusion bonding method or the like to seal the wound electrode body in the exterior members. In this case, adhesion films are inserted between the positive electrode lead and the exterior member and between the negative electrode lead and the exterior member.

In a second procedure, by a procedure similarly to the first procedure, after forming a positive electrode and a negative electrode, a positive electrode lead is attached to the positive electrode and a negative electrode lead is attached to the negative electrode. Next, after the positive electrode and the negative electrode are laminated via a separator and wound to produce a wound body as a precursor of a wound electrode body, a protective tape is attached to the outermost peripheral portion thereof. Next, after sandwiching the wound body between two film-like exterior members, outer peripheral edge portions other than one outer peripheral edge portion are attached to each other by using a heat fusion method or the like to house the wound body in the bag-shaped exterior member. Next, after preparing a composition for electrolyte containing an electrolyte solution, a monomer as a raw material of a polymer compound for electrolyte, a polymerization initiator, and, if necessary, another material such as a polymerization inhibitor and injecting the composition for electrolyte into the bag-shaped exterior member, the exterior member is hermetically sealed by using a heat fusion method or the like. Next, the monomer is thermally polymerized to form a polymer compound for electrolyte. In this way, a gel-like electrolyte layer is formed.

In a third procedure, a wound body is produced and housed in a bag-shaped exterior member similarly to the above-mentioned second procedure, except that a separator applied with a polymer compound on both surfaces is used. Examples of the polymer compound applied to the separator include polymers (homopolymer, copolymer, or multi-component copolymer) containing vinylidene fluoride as a component, and the like. Specific examples thereof include polyvinylidene fluoride, a binary copolymer containing vinylidene fluoride and hexafluoropropylene as components, a ternary copolymer containing vinylidene fluoride, hexafluoropropylene, and chlorotrifluoroethylene as components, and the like. Note that one or more kinds of other polymer compounds may be used together with the polymer containing vinylidene fluoride as a component. Next, after preparing an electrolyte solution and injecting the electrolyte solution in an exterior member, an opening of the exterior member is hermetically sealed by using a heat fusion method or the like. Next, the separator is brought into close contact with the positive electrode and the negative electrode via the polymer compound while heating the exterior member and applying a load. Accordingly, since the polymer compound is impregnated with the electrolyte solution, the polymer compound gels to form an electrolyte layer.

In this third procedure, swelling of the secondary battery is suppressed more than in the first procedure. Further, in the third procedure, since the monomer as a raw material of a polymer compound, the solvent, and the like are hardly left in the electrolyte layer as compared with the second procedure, the process of forming the polymer compound is favorably controlled. Therefore, the positive electrode, the negative electrode, and the separator, and the electrolyte layer are sufficiently brought into close contact with each other.

EXAMPLE

Hereinafter, examples of the present technology will be described.

Example 1

The secondary battery shown in FIG. 1 and FIG. 2 was produced by the following procedure.

[Method of Producing Positive Electrode]

First, a positive electrode active material, a binder, and a conductive agent were mixed to prepare a positive electrode mixture, and this positive electrode mixture was dispersed in a solvent such as N-methyl-2-pyrrolidone to obtain a positive electrode mixture slurry. Next, this positive electrode mixture slurry was applied to a positive electrode current collector and then dried, before being compression molded by a roll press machine or the like to form a positive electrode active material layer, thereby obtaining a positive electrode. Note that the additive amounts of the materials were 98.2 parts by mass of lithium cobalt oxide, 1.2 parts by weight of a conduction promoting agent, and 0.8 parts by weight of PVdF.

[Method of Producing Negative Electrode]

First, a negative electrode active material and a binder were mixed to prepare a negative electrode mixture, and this negative electrode mixture was dispersed in a solvent such as N-methyl-2-pyrrolidone to obtain a negative electrode mixture slurry. Next, after this negative electrode mixture slurry was applied to a negative electrode current collector and the solvent is dried, compression molding was performed by a roll press machine or the like to form a negative electrode active material layer, thereby obtaining a negative electrode. Note that the additive amounts of the materials were 81 parts by mass of natural graphite, 10 parts by mass of Si active material, 3 parts by weight of conduction promoting agent, and 6 parts by weight of PVdF.

[Method of Producing Separator]

A resin composition containing inorganic particles, a plasticizer, and various additives was melt-kneaded using an extruder, extruded from a T-die, cooled and solidified by a casting roll, and formed into a sheet shape, and the formed one was biaxially stretched at a high magnification. In this way, a separator was obtained.

[Method of Assembling Secondary Battery]

First, lithium bis(trifluoromethanesulfonyl) imide (LiTFSI) as an imide salt was added to 4-fluoro-1,3-dioxolan-2-one (FEC) as a halogenated cyclic carbonic acid ester that was a non-aqueous solvent, and dissolved. At this time, the concentration of LiTFSI in FEC was 1.08 mol/kg. Next, LiBOB as lithium oxalate borate was mixed so that the weight percent thereof was 10 wt % with respect to the total weight of FEC and LiTFSI. Further, vinylene carbonate (VC) was mixed as an unsaturated carbonic acid ester so that the weight percent thereof was 1 wt % with respect to the total weight of FEC, LiTFSI, and LiBOB. In this way, a non-aqueous electrolyte solution was obtained. This non-aqueous electrolyte solution was applied to the surfaces of the positive electrode and the negative electrode to form an electrolyte layer. Next, a positive electrode lead and a negative electrode lead were respectively attached to a positive electrode current collector and a negative electrode current collector.

Next, the positive electrode and negative electrode provided with the electrolyte layer were laminated via the separator and then wound in a longitudinal direction, and a protective tape was attached to the outermost peripheral portion to form an electrode body.

Finally, after sandwiching the electrode body between, for example, two film-like exterior members, outer edge portions of the exterior members were attached to each other by heat fusion or the like, and sealed under reduced pressure to seal the electrode body. An adhesion film was inserted between the positive electrode lead and the exterior member and between the negative electrode lead and the exterior member.

[Characteristic Test of Secondary Battery]

The cycle characteristics (capacity retention rate) of the secondary battery thus obtained were examined. The capacity retention rate was examined as follows. Under conditions of charging: 0.5C, CCCV: 4.35V/0.05C, cut, discharging: 0.5C, and 2.5 V cut, the capacity retention rate after 100 cycles with respect to the initial capacity retention rate was calculated.

The capacity retention rate after 100 cycles of a secondary battery according to an example 1 was 92.2%.

Example 2

A secondary battery was produced under conditions similar to that for the battery according to the example 1 except that the amount of LiBOB was set to 5 wt %, and the cycle characteristics thereof were evaluated. The capacity retention rate of the secondary battery according to the example 2 after 100 cycles was 93.3%. Note that since the amount of LiBOB was reduced as compared with the example 1, the amounts of LiTFSI and FEC were increased by that amount.

Example 3

A secondary battery was produced under conditions similar to that for the battery according to the example 1 except that the amount of LiBOB was set to 2.5 wt %, and the cycle characteristics thereof were evaluated. The capacity retention rate of the secondary battery according to the example 3 after 100 cycles was 94.1%. Note that since the amount of LiBOB was reduced as compared with the example 1, the amounts of LiTFSI and FEC were increased by that amount.

Example 4

A secondary battery was produced under conditions similar to that for the battery according to the example 1 except that the amount of LiBOB was set to 0.4 wt %, and the cycle characteristics thereof were evaluated. The capacity retention rate of the secondary battery according to the example 4 after 100 cycles was 95.8%. Note that since the amount of LiBOB was reduced as compared with the example 1, the amounts of LiTFSI and FEC were increased by that amount.

Example 5

A secondary battery was produced under conditions similar to that for the battery according to the example 1 except that 5 wt % of LiODFB was mixed instead of mixing 10 wt % of LiBOB, and the cycle characteristics thereof were evaluated. The capacity retention rate of the secondary battery according to the example 5 after 100 cycles was 90.1%. Note that since the amount of LiODFB was smaller than the amount of LiBOB of the example 1, the amounts of LiTFSI and FEC were increased by that amount.

Example 6

A secondary battery was produced under conditions similar to that for the battery according to the example 1 except that 1 wt % of LiODFB was mixed instead of mixing 10 wt % of LiBOB, and the cycle characteristics thereof were evaluated. The capacity retention rate of the secondary battery according to the example 6 after 100 cycles was 91.8%. Note that since the amount of LiODFB was smaller than the amount of LiBOB of the example 1, the amounts of LiTFSI and FEC were increased by that amount.

Example 7

A secondary battery was produced under conditions similar to that for the battery according to the example 1 except that no VC was added, and the cycle characteristics thereof were evaluated. The capacity retention rate of the secondary battery according to the example 7 after 100 cycles was 91.3%. Note that since no VC was added, the amounts of LiTFSI, FEC, and LiBOB were increased by that amount as compared with the example 1.

Comparative Example 1

A secondary battery was produced under conditions similar to that for the battery according to the example 1 except that no LiBOB was added, and the cycle characteristics thereof were evaluated. The capacity retention rate of the secondary battery according to the comparative example 1 after 100 cycles was 85.2%. Note that since no LiBOB was added, the amounts of LiTFSI and FEC were increased by that amount as compared with the example 1.

Comparative Example 2

A secondary battery was produced under conditions similar to that for the battery according to the comparative example 1 except that lithium hexafluorophosphate ($LiPF_6$) was dissolved in FEC instead of dissolving LiTFSI in FEC, and the cycle characteristics thereof were evaluated. The capacity retention rate of the secondary battery according to the comparative example 2 after 100 cycles was 89.1%.

Comparative Example 3

A secondary battery was produced under conditions similar to that for the battery according to the comparative example 2 except that a solution obtained by mixing ethylene carbonate (EC) and propylene carbonate (PC) at a weight ratio of 1:1 was used instead of FEC, and the cycle characteristics thereof were evaluated. The capacity retention rate of the secondary battery according to the comparative example 3 after 100 cycles was 80.3%. Note that since EC and PC were used instead of FEC, VC was mixed so that the weight percent thereof was 1 wt % with respect to the total weight of EC, PC, LiTFSI, and LiBOB.

Comparative Example 4

A secondary battery was produced under conditions similar to that for the battery according to the comparative example 2 except that LiBOB was added so that the weight percent thereof was 5 wt % with respect to the total weight of FEC and LiPF$_6$, and the cycle characteristics thereof were evaluated. The capacity retention rate of the secondary battery according to the comparative example 4 after 100 cycles was 87.7%. Note that since LiBOB was added, the amount of LiPF$_6$ and FEC were reduced by that amount as compared with the comparative example 2.

Comparative Example 5

A secondary battery was produced under conditions similar to that for the battery according to the comparative example 3 except that LiBOB was added so that the weight percent thereof was 5 wt % with respect to the total weight of EC, PC, and LiPF$_6$, and the cycle characteristics thereof were evaluated. The capacity retention rate of the secondary battery according to the comparative example 5 after 100 cycles was 81.0%. Note that since LiBOB was added, the amount of LiPF$_6$, EC, and PC were reduced by that amount as compared with the comparative example 3.

The results of the above-mentioned examples 1 to 7 and the comparative examples 1 to 5 are collectively shown in Table 1.

according to the example 1 is slightly higher (92.2−91.3=0.9%). This is presumed to be the effect of mixing VC. Meanwhile, when comparing the example 1 and the comparative example 1, the capacity retention rate of the secondary battery according to the example 1 is much higher (92.2−85.2=7.0%). This is presumed to be the effect of mixing LiBOB. That is, the effect of improving the capacity retention rate is much higher when LiBOB is mixed than when VC is mixed. Therefore, the effect of improving the capacity retention rate is presumed to be mainly due to LiBOB.

When comparing the example 2 and the comparative example 4, it can be seen that the effect of improving the capacity retention rate of LiTFSI is higher than that of LiPF$_6$. Although LiBOB is mixed in the comparative example 4, the capacity retention rate is not sufficiently improved. This is considered to be due to a thick coating film formed by LiPF$_6$ on the negative electrode. Meanwhile, it is presumed that LiBOB forms a favorably coating film on the negative electrode.

Therefore, by using LiBOB and LiTFSI, it is possible to improve the capacity retention rate of the secondary battery after repeating charging and discharging.

Modified Example

Although the above-mentioned secondary battery 20 has been described as a lithium ion secondary battery, it is not limited thereto. For example, as a positive electrode active material, a metal sulfide or metal oxide containing no lithium such as TiS$_2$, MoS$_2$, NbSe$_2$, and V$_2$O$_5$, or the like may be used. These positive electrode active materials may each be used alone, or a plurality of kinds of them may be mixed and used.

The above-mentioned secondary battery 20 can be mounted on an apparatus such as an electronic apparatus, an electric vehicle, and a power storage apparatus, or used for supplying electric power.

Examples of the electronic apparatus include a laptop personal computer, a PDA (personal digital assistant), a mobile phone, a cordless phone handset, a video movie, a

TABLE 1

|  | LiPF6 | LiTFSI | LiBOB | LiODFB | FEC | VC | EC | PC | 100 cycle retention rate |
|---|---|---|---|---|---|---|---|---|---|
| Example 1 | 0 | 21.30 | 9.00 | 0 | 68.71 | 0.99 | 0 | 0 | 92.2 |
| Example 2 | 0 | 22.31 | 4.71 | 0 | 71.98 | 0.99 | 0 | 0 | 93.3 |
| Example 3 | 0 | 22.86 | 2.41 | 0 | 73.74 | 0.99 | 0 | 0 | 94.1 |
| Example 4 | 0 | 23.34 | 0.39 | 0 | 75.28 | 0.99 | 0 | 0 | 95.8 |
| Example 5 | 0 | 22.32 | 0 | 4.72 | 72.02 | 0.94 | 0 | 0 | 90.1 |
| Example 6 | 0 | 23.20 | 0 | 0.98 | 74.84 | 0.98 | 0 | 0 | 91.8 |
| Example 7 | 0 | 21.51 | 9.09 | 0 | 69.40 | 0 | 0 | 0 | 91.3 |
| Comparative Example 1 | 0 | 23.43 | 0 | 0 | 75.58 | 0.99 | 0 | 0 | 85.2 |
| Comparative Example 2 | 13.97 | 0 | 0 | 0 | 85.17 | 0.85 | 0 | 0 | 89.1 |
| Comparative Example 3 | 13.97 | 0 | 0 | 0 | 0 | 0.85 | 42.59 | 42.59 | 80.3 |
| Comparative Example 4 | 13.31 | 0 | 4.72 | 0 | 81.11 | 0.86 | 0 | 0 | 87.7 |
| Comparative Example 5 | 13.31 | 0 | 4.72 | 0 | 0 | 0.86 | 40.56 | 40.56 | 81.0 |

When comparing the examples 5 and 6 and the comparative example 1, it can be seen that the capacity retention rate is improved by adding LiODFB.

Further, when comparing the examples 2 and 5, it can be seen that the effect of improving the capacity retention rate of LiBOB is higher than that of LiODFB.

When comparing the example 1 and the example 7, it can be seen that the capacity retention rate the secondary battery digital still camera, an e-book, an electronic dictionary, a music player, a radio, a headphone, a game machine, a navigation system, a memory card, a pacemaker, a hearing aid, an electric tool, an electric shaver, a refrigerator, an air conditioner, a television receiver, a stereo, a water heater, a microwave oven, a dishwasher, a washing machine, a dryer, a lighting equipment, a toy, medical equipment, a robot, a load conditioner, a traffic light, and the like. In this case, examples of a power receiving circuit that receives power supply from the secondary battery 20 include an IC part, various electric and electronic parts such as light emitting parts, a circuit board on which these parts are mounted, an actuator such as a motor, and the like.

Examples of the electric vehicle include a railway vehicle, a golf cart, an electric cart, and an electric automobile (including a hybrid automobile), and the like, and it is used as the driving power source or auxiliary power source therefor.

Examples of the power storage apparatus include power sources for power storage for buildings including houses or for power generation facilities.

Hereinafter, as a representative, a battery pack will be described as an example.

Figure 3:
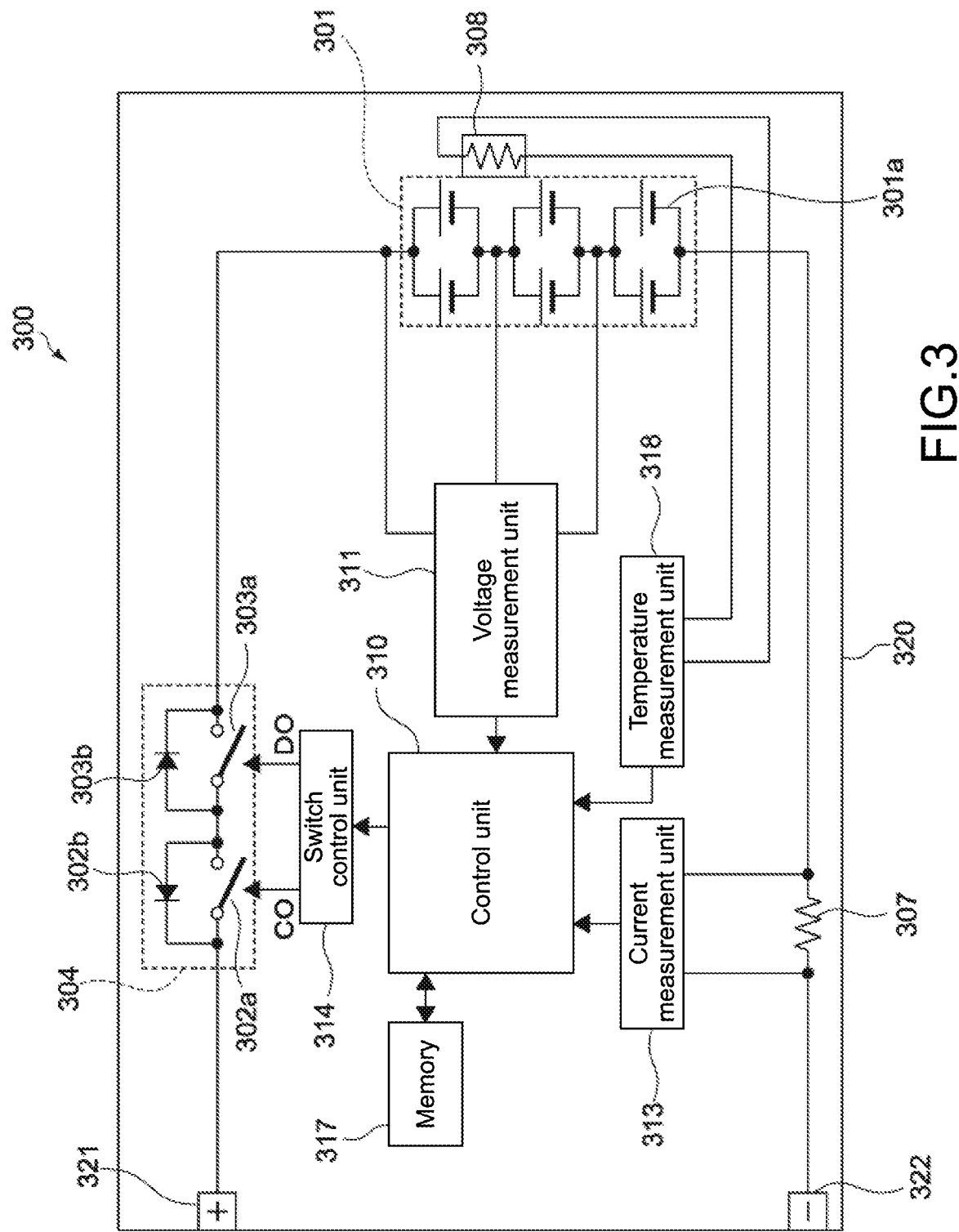
FIG. 3 is a block diagram showing a configuration of a battery pack according to an embodiment of the present technology.

FIG. 3 is a block diagram showing a circuit configuration example of a battery pack including a secondary battery. A battery pack 300 mainly includes a cell 301, a switching unit 304, a control unit 310, and a package body 320 supporting them.

The battery pack 300 includes a positive electrode terminal 321 and a negative electrode terminal 322, and is charged by respectively connecting the positive electrode terminal 321 and the negative electrode terminal 322 to a positive electrode terminal and a negative electrode terminal of a charger. Further, at the time of using the electronic apparatus, it discharges by respectively connecting the positive electrode terminal 321 and the negative electrode terminal 322 to a positive electrode terminal and a negative electrode terminal of the electronic apparatus to supply electric power to a power receiving circuit in the electronic apparatus.

The cell 301 includes a group cell in which a plurality of a plurality of secondary batteries 301a are connected to each other in series and/or in parallel. To each secondary battery 301a, the secondary battery 20 described in the first embodiment is applied. Note that an example in which although six secondary batteries 301a are connected to each other in the form of 2 batteries in parallel and 3 batteries in series (2P3S) is shown in FIG. 3, any connection form may be used such as the form of n batteries in parallel and m batteries in series (n and m each represent a positive integer).

The switching unit 304 includes a charge control switch 302a, a diode 302b, a discharge control switch 303a, and a diode 303b, and is controlled by a switch control unit 314.

The diode 302b has a polarity that is in an opposite direction with respect to charging current flowing from the positive electrode terminal 321 to the cell 301, and in a forward direction with respect to discharging current flowing from the negative electrode terminal 322 to the cell 301. The diode 303b has a polarity that is in a forward direction with respect to the charging current, and in an opposite direction with respect to the discharging current. Note that although the switching unit 304 is provided on the side of the positive electrode terminal 321, it may be provided on the side of the negative electrode terminal 322.

The charge control switch 302a is turned off when the battery voltage reaches overcharge detection voltage, and controlled by the control unit 310 so that no charging current flows in the current path of the cell 301. After the charge control switch 302a is turned off, only discharging can be performed via the diode 302b. Further, it is turned off when a large amount of current flows during charging, and controlled by the control unit 310 so that charging current flowing in the current path of the cell 301 is cut off.

The discharge control switch 303a is turned off when the battery voltage reaches overdischarge detection voltage, and controlled by the control unit 310 so that no discharging current flows in the current path of the cell 301. After the discharge control switch 303a is turned off, only charging can be performed via the diode 303b. Further, it is turned off when a large amount of current flows during discharging, and controlled by the control unit 310 so that discharging current flowing in the current path of the cell 301 is cut off.

A temperature detection device 308 is, for example, a thermistor, provided in the vicinity of the cell 301, measures the temperature of the cell 301, and supplies the measured temperature to a temperature measurement unit 318. The temperature measurement unit 318 supplies information on the temperature measured by using the temperature detection device 308 to the control unit 310. The control unit 310 performs charging and discharging control at abnormal heat generation and correction in calculation of the remaining capacity on the basis of the output of the temperature measurement unit 318.

A voltage measurement unit 311 measures voltage of the cell 301 and each secondary battery 301a constituting the cell 301, performs A/D conversion on the measured voltage, and supplies it to the control unit 310. A current measurement unit 313 measure current by using a current detection resistor 307, and supplies the measured current to the control unit 310.

The switch control unit 314 is controlled by the control unit 310, and controls the charge control switch 302a and the discharge control switch 303a of the switching unit 304 on the basis of voltage and current input from the voltage measurement unit 311 the current measurement unit 313. In the case where voltage of any of the secondary batteries 301a reaches overcharge detection voltage or becomes not more than overdischarge detection voltage or a large amount of current suddenly flows, the switch control unit 314 transmits a control signal of the switching unit 304 to prevent overcharging, overdischarging, overcurrent charging/discharging.

Note that in the case of a lithium ion secondary battery, the overcharge detection voltage is set to, for example, 4.20 V±0.05 V, and the overdischarge detection voltage is set to, for example, 2.4 V±0.1 V.

As the charge control switch 302a and the discharge control switch 303a, for example, a semiconductor switch such as a MOSFET is used. In this case, the parasitic diode of the MOSFET functions as the diodes 302b and 303b. In the case where P-channel FETs are used as the charge control switch 302a and the discharge control switch 303a, the switch control unit 314 supplies control signals DO and CO to respective gates of the charge control switch 302a and the discharge control switch 303a.

In the case where the charge control switch 302a and the discharge control switch 303a are P-channel type, they are turned on by a gate potential lower than the source potential by a predetermined value or more. That is, in the normal charging and discharging operation, the control signals CO and DO are set to the low level, and the charge control switch 302a and the discharge control switch 303a are in an off-state.

A memory 317 includes a RAM or ROM, and includes, for example, a EPROM (Erasable Programmable Read Only Memory) that is a non-volatile memory. In the memory 317, numerical values calculated by the control unit 310, internal resistance values of the battery in the initial state of each secondary battery 301a measured at the stage of the production process, and the like are stored in advance, and rewriting can be appropriately performed. Further, by storing the full charge capacity of the secondary battery 301a, it is possible to, for example, calculate the remaining capacity together with the control unit 310.

Although the embodiment of the present technology has been described heretofore, the present technology is not limited thereto, and various modifications can be made on the basis of the technical ideas of the present technology.

For example, a lithium ion secondary battery has been described as an example in the above-mentioned embodiment, the present technology is not limited thereto, and can be applied also to a nickel metal hydride battery, a nickel-cadmium battery, a lithium-manganese dioxide battery, a lithium-iron sulfide battery, and separators for these batteries.

Further, although a secondary battery having a winding structure has been described in the above-mentioned embodiment, it can be similarly applied also to a battery having a structure in which a positive electrode and a negative electrode are folded or stacked. In addition, the present technology can be applied also to so-called coin-type, button-type, and square-type batteries. Further, the present technology can be applied not only to a secondary battery but also to a primary battery.

It should be noted that the present technology may take the following configurations.

(1)

A non-aqueous electrolyte solution, including:

an electrolyte salt; and a non-aqueous solvent, in which the electrolyte salt contains an imide salt as a main electrolyte salt, the imide salt being represented by a following formula (1), and at least one lithium oxalate borate selected from the group consisting of lithium bis(oxalate) borate (LiBOB), lithium fluoro(oxalate) borate (LiFOB), and lithium difluoro(oxalate) borate (LiDFOB), and the non-aqueous solvent contains at least one halogenated carbonic acid ester selected from the group consisting of a halogenated chain carbonic acid ester represented by a following formula (2) and a halogenated cyclic carbonic acid ester represented by a following formula (3).

[Chem. 1]

$$R1-\underset{\underset{O}{\overset{O}{\|}}}{\overset{O}{\underset{\|}{S}}}-N^{-}-\underset{\underset{O}{\overset{O}{\|}}}{\overset{O}{\underset{\|}{S}}}-R2 \quad (1)$$

(in the formula, R1 and R2 each independently represent a hydrogen atom, a halogen atom, an alkyl group, or a halogenated alkyl group, and at least one of them is a halogen atom or a halogenated alkyl group.)

[Chem. 2]

$$R1-\underset{\underset{R21}{\overset{R23}{|}}}{\overset{R23}{\underset{|}{C}}}-O-\underset{\underset{O}{\overset{\|}{C}}}{C}-O-\underset{\underset{R26}{\overset{R24}{|}}}{\overset{R24}{\underset{|}{C}}}-R25 \quad (2)$$

(in the formula, R21 to R26 each independently represent a hydrogen atom, a halogen atom, an alkyl group, or a halogenated alkyl group, and at least one of them is a halogen atom or a halogenated alkyl group.)

[Chem. 3]

$$\begin{array}{c} R28 \quad R29 \\ R27-\overset{|}{C}-\overset{|}{C}-R30 \\ O \quad O \\ \underset{\|}{C} \\ O \end{array} \quad (3)$$

(in the formula, R27 to R30 each independently represent a hydrogen atom, a halogen atom, an alkyl group, or a halogenated alkyl group, and at least one of them is a halogen atom or a halogenated alkyl group.)

(2)

The non-aqueous electrolyte solution according to (1) above, in which the content of the imide salt is not less than 0.3 mol/kg and not more than 2.5 mol/kg with respect to the total amount of the non-aqueous solvent.

(3)

The non-aqueous electrolyte solution according to (1) or (2) above, in which the content of the lithium oxalate borate is not less than 0.1 wt % and not more than 10 wt % with respect to the total amount of the imide salt and the non-aqueous solvent.

(4)

The non-aqueous electrolyte solution according to any one of (1) to (3) above, in which the non-aqueous solvent contains the halogenated chain carbonic acid ester, and the halogenated chain carbonic acid ester is at least one kind selected from the group consisting of fluoromethyl methyl carbonate, bis(fluoromethyl) carbonate, and difluoromethyl methyl carbonate.

(5)

The non-aqueous electrolyte solution according to any one of (1) to (4) above, in which the non-aqueous solvent contains the halogenated cyclic carbonic acid ester, and the halogenated cyclic carbonic acid ester is at least one kind selected from the group consisting of 4-fluoro-1,3-dioxolan-2-one, (FEC), and 4,5-Difluoro-1,3-dioxolan-2-one (DFEC).

(6)

The non-aqueous electrolyte solution according to any one of (1) to (5) above, in which the halogenated carbonic acid ester has a volume of not less than 75% of a volume of the non-aqueous solvent.

(7)

The non-aqueous electrolyte solution according to any one of (1) to (6) above, in which the imide salt is lithium bis(trifluoromethanesulfonyl) imide (LiTFSI).

(8)

The non-aqueous electrolyte solution according to any one of (1) to (7) above, in which the lithium oxalate borate is lithium bis(oxalate) borate (LiBOB).

(9)

A non-aqueous electrolyte secondary battery, including:
a positive electrode;
a negative electrode; and
a non-aqueous electrolyte solution containing an electrolyte salt and a non-aqueous solvent, in which
the electrolyte salt contains
an imide salt as a main electrolyte salt, the imide salt being represented by a following formula (1), and
at least one lithium oxalate borate selected from the group consisting of lithium bis(oxalate) borate (LiBOB), lithium fluoro(oxalate) borate (LiFOB), and lithium difluoro(oxalate) borate (LiDFOB), and
the non-aqueous solvent contains at least one halogenated carbonic acid ester selected from the group consisting of a halogenated chain carbonic acid ester represented by a following formula (2) and a halogenated cyclic carbonic acid ester represented by a following formula (3).

[Chem. 1]

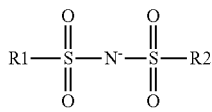

(1)

(in the formula, R1 and R2 each independently represent a hydrogen atom, a halogen atom, an alkyl group, or a halogenated alkyl group, and at least one of them is a halogen atom or a halogenated alkyl group.)

[Chem. 2]

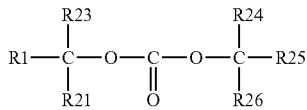

(2)

(in the formula, R21 to R26 each independently represent a hydrogen atom, a halogen atom, an alkyl group, or a halogenated alkyl group, and at least one of them is a halogen atom or a halogenated alkyl group.)

[Chem. 3]

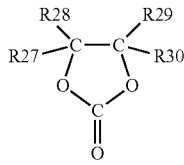

(3)

(in the formula, R27 to R30 each independently represent a hydrogen atom, a halogen atom, an alkyl group, or a halogenated alkyl group, and at least one of them is a halogen atom or a halogenated alkyl group.)

(10)

The non-aqueous electrolyte secondary battery according to (9) above, in which
the negative electrode includes a negative electrode current collector and a negative electrode active material layer provided in the negative electrode current collector, and
the negative electrode active material layer contains at least one metal material selected from the group consisting of a simple substance, an alloy, and a compound of silicon and a simple substance, an alloy, and a compound of tin, and at least one carbon material.

(11)

The non-aqueous electrolyte secondary battery according to (9) or (10) above, in which
the non-aqueous solvent contains the halogenated cyclic carbonic acid ester, and
the halogenated cyclic carbonic acid ester is 4-fluoro-1,3-dioxolan-2-one, (FEC).

(12)

The non-aqueous electrolyte secondary battery according to any one of (9) to (11) above, in which
the imide salt is lithium bis(trifluoromethanesulfonyl) imide (LiTFSI).

(13)

The non-aqueous electrolyte secondary battery according to any one of (9) to (12) above, in which
the lithium oxalate borate is lithium bis(oxalate) borate (LiBOB).

(14)

A battery pack, including:
a non-aqueous electrolyte secondary battery;
a control unit that controls charging and discharging of the non-aqueous electrolyte secondary battery; and
a package body that supports the non-aqueous electrolyte secondary battery and the control unit, in which
the non-aqueous electrolyte secondary battery includes
a positive electrode,
a negative electrode, and
a non-aqueous electrolyte solution containing an electrolyte salt and a non-aqueous solvent, and
the electrolyte salt contains
an imide salt as a main electrolyte salt, the imide salt being represented by a following formula (1), and
at least one lithium oxalate borate selected from the group consisting of lithium bis(oxalate) borate (LiBOB), lithium fluoro(oxalate) borate (LiFOB), and lithium difluoro(oxalate) borate (LiDFOB), and
the non-aqueous solvent contains at least one halogenated carbonic acid ester selected from the group consisting of a halogenated chain carbonic acid ester represented by a following formula (2) and a halogenated cyclic carbonic acid ester represented by a following formula (3).

[Chem. 1]

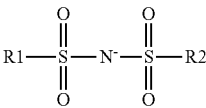

(1)

(in the formula, R1 and R2 each independently represent a hydrogen atom, a halogen atom, an alkyl group, or a halogenated alkyl group, and at least one of them is a halogen atom or a halogenated alkyl group.)

[Chem. 2]

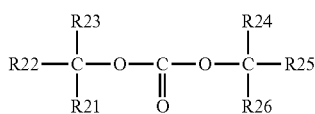
(2)

(in the formula, R21 to R26 each independently represent a hydrogen atom, a halogen atom, an alkyl group, or a halogenated alkyl group, and at least one of them is a halogen atom or a halogenated alkyl group.)

[Chem. 3]

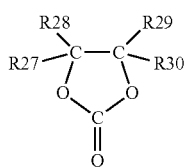
(3)

(in the formula, R27 to R30 each independently represent a hydrogen atom, a halogen atom, an alkyl group, or a halogenated alkyl group, and at least one of them is a halogen atom or a halogenated alkyl group.)

(15) An electronic apparatus, including:
a non-aqueous electrolyte secondary battery including
a positive electrode,
a negative electrode, and
a non-aqueous electrolyte solution containing an electrolyte salt and a non-aqueous solvent; and
a power receiving circuit that receives power supply from the non-aqueous electrolyte secondary battery, in which
the electrolyte salt contains
an imide salt as a main electrolyte salt, the imide salt being represented by a following formula (1), and
at least one lithium oxalate borate selected from the group consisting of lithium bis(oxalate) borate (LiBOB), lithium fluoro(oxalate) borate (LiFOB), and lithium difluoro(oxalate) borate (LiDFOB), and
the non-aqueous solvent contains at least one halogenated carbonic acid ester selected from the group consisting of a halogenated chain carbonic acid ester represented by a following formula (2) and a halogenated cyclic carbonic acid ester represented by a following formula (3).

[Chem. 1]

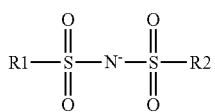
(1)

(in the formula, R1 and R2 each independently represent a hydrogen atom, a halogen atom, an alkyl group, or a halogenated alkyl group, and at least one of them is a halogen atom or a halogenated alkyl group.)

[Chem. 2]

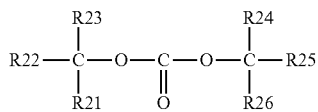
(2)

(in the formula, R21 to R26 each independently represent a hydrogen atom, a halogen atom, an alkyl group, or a halogenated alkyl group, and at least one of them is a halogen atom or a halogenated alkyl group.)

[Chem. 3]

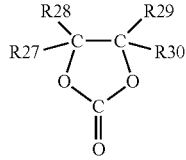
(3)

(in the formula, R27 to R30 each independently represent a hydrogen atom, a halogen atom, an alkyl group, or a halogenated alkyl group, and at least one of them is a halogen atom or a halogenated alkyl group.)

REFERENCE SIGNS LIST 10 electrode body
11 positive electrode
12 negative electrode
13 separator
14 electrolyte layer
20 secondary battery
300 battery pack

What is claimed is:
1. A non-aqueous electrolyte solution, comprising:
an electrolyte salt; and
a non-aqueous solvent, wherein
the electrolyte salt comprises:
an imide salt comprising a lithium cation and an anion represented by formula (1), wherein a weight percent of the imide salt with respect to the electrolyte salt is from 50 wt % to 90 wt %, and
at least one lithium oxalate borate selected from the group consisting of lithium bis(oxalate) borate (LiBOB), lithium fluoro(oxalate) borate (LiFOB), and lithium difluoro(oxalate) borate (LiDFOB), and
wherein the non-aqueous solvent contains at least one halogenated carbonic acid ester selected from the group consisting of a halogenated chain carbonic acid ester represented by formula (2) and a halogenated cyclic carbonic acid ester represented by formula (3), wherein the halogenated carbonic acid ester has a volume of not less than 75% of a volume of the non-aqueous solvent, wherein formula (1) is represented by:

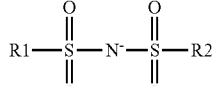
(1)

wherein R1 and R2 each independently represent a hydrogen atom, a halogen atom, an alkyl group, or a halogenated alkyl group, and at least one of R1 and R2 is a halogen atom or a halogenated alkyl group, wherein formula (2) is represented by:

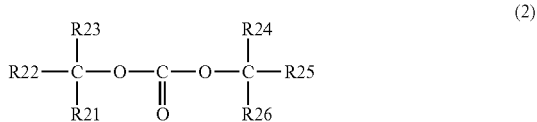

(2)

wherein R21 to R26 each independently represent a hydrogen atom, a halogen atom, an alkyl group, or a halogenated alkyl group, and at least one of R21 to R26 is a halogen atom or a halogenated alkyl group, and wherein formula (3) is represented by:

(3)

wherein R27 to R30 each independently represent a hydrogen atom, a halogen atom, an alkyl group, or a halogenated alkyl group, and at least one of R27 to R30 is a halogen atom or a halogenated alkyl group.

2. The non-aqueous electrolyte solution according to claim 1, wherein an amount of the imide salt is not less than 0.3 mol/kg and not more than 2.5 mol/kg with respect to a total amount of the non-aqueous solvent.

3. The non-aqueous electrolyte solution according to claim 1, wherein an amount of the lithium oxalate borate is not less than 0.1 wt % and not more than 10 wt % with respect to a total amount of the imide salt and the non-aqueous solvent.

4. The non-aqueous electrolyte solution according to claim 1, wherein
the non-aqueous solvent contains the halogenated chain carbonic acid ester, and
the halogenated chain carbonic acid ester is at least one of fluoromethyl methyl carbonate, bis(fluoromethyl) carbonate, and difluoromethyl methyl carbonate.

5. The non-aqueous electrolyte solution according to claim 1, wherein the non-aqueous solvent contains the halogenated cyclic carbonic acid ester, and
the halogenated cyclic carbonic acid ester is at least one of 4-fluoro-1,3-dioxolan-2-one (FEC), and 4,5-Difluoro-1,3-dioxolan-2-one (DFEC).

6. The non-aqueous electrolyte solution according to claim 1, wherein the imide salt is lithium bis(trifluoromethanesulfonyl) imide (LiTFSI).

7. The non-aqueous electrolyte solution according to claim 1, wherein the lithium oxalate borate is lithium bis(oxalate) borate (LiBOB).

8. A non-aqueous electrolyte secondary battery, comprising:
a positive electrode;
a negative electrode; and
a non-aqueous electrolyte solution containing an electrolyte salt and a non-aqueous solvent, wherein the electrolyte salt comprises
an imide salt comprising a lithium cation and an anion represented by formula (1), wherein a weight percent of the imide salt with respect to the electrolyte salt is from 50 to 90 wt %, and
at least one lithium oxalate borate selected from the group consisting of lithium bis(oxalate) borate (LiBOB), lithium fluoro(oxalate) borate (LiFOB), and lithium difluoro(oxalate) borate (LiDFOB), and
wherein the non-aqueous solvent contains at least one halogenated carbonic acid ester selected from the group consisting of a halogenated chain carbonic acid ester represented by formula (2) and a halogenated cyclic carbonic acid ester represented by formula (3), wherein the halogenated carbonic acid ester has a volume of not less than 75% of a volume of the non-aqueous solvent,
wherein formula (1) is represented by:

(1)

wherein R1 and R2 each independently represent a hydrogen atom, a halogen atom, an alkyl group, or a halogenated alkyl group, and at least one of R1 and R2 is a halogen atom or a halogenated alkyl group, wherein formula (2) is represented by:

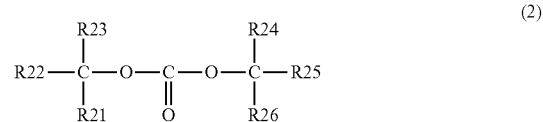

(2)

wherein R21 to R26 each independently represent a hydrogen atom, a halogen atom, an alkyl group, or a halogenated alkyl group, and at least one of R21 to R26 is a halogen atom or a halogenated alkyl group, wherein formula (3) is represented by:

(3)

wherein R27 to R30 each independently represent a hydrogen atom, a halogen atom, an alkyl group, or a halogenated alkyl group, and at least one of R27 to R30 is a halogen atom or a halogenated alkyl group.

9. The non-aqueous electrolyte secondary battery according to claim 8, wherein
the negative electrode includes a negative electrode current collector and a negative electrode active material layer provided on the negative electrode current collector, and
the negative electrode active material layer contains at least one material selected from the group consisting of silicon, an alloy of silicon, a compound of silicon, tin, an alloy of tin, a compound of tin, and a carbon material.

10. The non-aqueous electrolyte secondary battery according to claim 8, wherein
the non-aqueous solvent contains the halogenated cyclic carbonic acid ester, and
the halogenated cyclic carbonic acid ester is 4-fluoro-1,3-dioxolan-2-one (FEC).

11. The non-aqueous electrolyte secondary battery according to claim 10, wherein the imide salt is lithium bis(trifluoromethanesulfonyl) imide (LiTFSI).

12. The non-aqueous electrolyte secondary battery according to claim 11, wherein the lithium oxalate borate is lithium bis(oxalate) borate (LiBOB).

13. A battery pack, comprising:
a non-aqueous electrolyte secondary battery;
a control unit that controls charging and discharging of the non-aqueous electrolyte secondary battery; and
a package body that supports the non-aqueous electrolyte secondary battery and the control unit, wherein
the non-aqueous electrolyte secondary battery includes:
a positive electrode,
a negative electrode, and
a non-aqueous electrolyte solution containing an electrolyte salt and a non-aqueous solvent, and
the electrolyte salt comprises:
an imide salt comprising a lithium cation and an anion represented by formula (1) wherein a weight percent of the imide salt with respect to the electrolyte salt is from 50 to 90 wt %, and
at least one lithium oxalate borate selected from the group consisting of lithium bis(oxalate) borate (LiBOB), lithium fluoro(oxalate) borate (LiFOB), and lithium difluoro(oxalate) borate (LiDFOB), and
wherein the non-aqueous solvent contains at least one halogenated carbonic acid ester selected from the group consisting of a halogenated chain carbonic acid ester represented by formula (2) and a halogenated cyclic carbonic acid ester represented by formula (3),
wherein formula (1) is represented by:

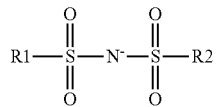

(1)

wherein R1 and R2 each independently represent a hydrogen atom, a halogen atom, an alkyl group, or a halogenated alkyl group, and at least one of R1 and R2 is a halogen atom or a halogenated alkyl group,
wherein formula (2) is represented by:

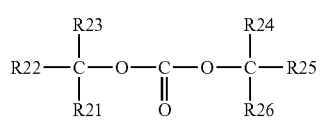

(2)

wherein R21 to R26 each independently represent a hydrogen atom, a halogen atom, an alkyl group, or a halogenated alkyl group, and at least one of R21 to R26 is a halogen atom or a halogenated alkyl group, wherein formula (3) is represented by:

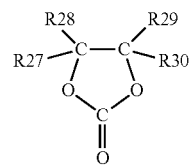

(3)

wherein R27 to R30 each independently represent a hydrogen atom, a halogen atom, an alkyl group, or a halogenated alkyl group, and at least one of R27 to R30 is a halogen atom or a halogenated alkyl group.

14. An electronic apparatus, comprising:
a non-aqueous electrolyte secondary battery including:
a positive electrode,
a negative electrode, and
a non-aqueous electrolyte solution containing an electrolyte salt and a non-aqueous solvent; and
a power receiving circuit that receives power supply from the non-aqueous electrolyte secondary battery, wherein
the electrolyte salt comprises:
an imide salt comprising a lithium cation and an anion represented by formula (1) wherein a weight percent of the imide salt with respect to the electrolyte salt is from 50 to 90 wt %, and
at least one lithium oxalate borate selected from the group consisting of lithium bis(oxalate) borate (LiBOB), lithium fluoro(oxalate) borate (LiFOB), and lithium difluoro(oxalate) borate (LiDFOB), and
wherein the non-aqueous solvent contains at least one halogenated carbonic acid ester selected from the group consisting of a halogenated chain carbonic acid ester represented by formula (2) and a halogenated cyclic carbonic acid ester represented by formula (3),
wherein formula (1) is represented by:

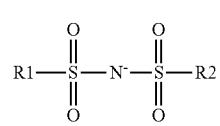

(1)

wherein R1 and R2 each independently represent a hydrogen atom, a halogen atom, an alkyl group, or a halogenated alkyl group, and at least one of R1 and R2 is a halogen atom or a halogenated alkyl group,
wherein formula (2) is represented by:

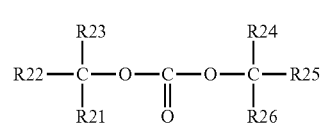

(2)

wherein R21 to R26 each independently represent a hydrogen atom, a halogen atom, an alkyl group, or a halogenated alkyl group, and at least one of R21 to R26 is a halogen atom or a halogenated alkyl group, wherein formula (3) is represented by:

(3)

wherein R27 to R30 each independently represent a hydrogen atom, a halogen atom, an alkyl group, or a halogenated alkyl group, and at least one of R27 to R30 is a halogen atom or a halogenated alkyl group.

15. The non-aqueous electrolyte solution according to claim 1, wherein the electrolyte salt further comprises $LiPF_6$, $LiBF_4$, $LiClO_4$, $LiAsF_6$, or a combination thereof.

16. The non-aqueous electrolyte solution according to claim 1, wherein the electrolyte salt further comprises less than 10 wt. % of $LiPF_6$ with respect to the non-aqueous electrolytic solution.

17. The non-aqueous electrolyte solution according to claim 1, wherein the halogenated carbonic acid ester is the halogenated chain carbonic acid ester of formula (2).

18. The non-aqueous electrolyte solution according to claim 1, wherein the halogenated carbonic acid ester is the halogenated cyclic carbonic acid ester of formula (3).

* * * * *